United States Patent
Kishida et al.

(10) Patent No.: US 12,546,517 B2
(45) Date of Patent: Feb. 10, 2026

(54) REFRIGERATION CYCLE APPARATUS

(71) Applicant: Mitsubishi Electric Corporation, Tokyo (JP)

(72) Inventors: Nanami Kishida, Tokyo (JP); Yoji Onaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 138 days.

(21) Appl. No.: 18/567,035

(22) PCT Filed: Jun. 29, 2021

(86) PCT No.: PCT/JP2021/024504
§ 371 (c)(1),
(2) Date: Dec. 5, 2023

(87) PCT Pub. No.: WO2023/275973
PCT Pub. Date: Jan. 5, 2023

(65) Prior Publication Data
US 2024/0271837 A1 Aug. 15, 2024

(51) Int. Cl.
*F25B 39/04* (2006.01)
*F25B 13/00* (2006.01)
(Continued)

(52) U.S. Cl.
CPC ............ *F25B 39/04* (2013.01); *F28D 1/0417* (2013.01); *F28D 1/0461* (2013.01);
(Continued)

(58) Field of Classification Search
CPC ............ F28F 9/0204; F28F 2009/0295; F28F 2009/0287; F25B 2400/054;
(Continued)

(56) References Cited

U.S. PATENT DOCUMENTS 5,505,060 A * 4/1996 Kozinski ............... F25B 43/006
62/503
6,189,334 B1 * 2/2001 Dienhart ................. F25B 39/04
62/509
(Continued)

FOREIGN PATENT DOCUMENTS

DE 10060114 A1 6/2001
JP H06-026780 A 2/1994
(Continued)

OTHER PUBLICATIONS

International Search Report and Written Opinion mailed on Aug. 3, 2021, received for PCT Application PCT/JP2021/024504, filed on Jun. 29, 2021, 9 pages including English Translation.
(Continued)

*Primary Examiner* — Christopher R Zerphey
(74) *Attorney, Agent, or Firm* — XSENSUS LLP

(57) ABSTRACT

A refrigeration cycle apparatus includes a refrigerant circuit in which at least a compressor, a condenser, a first pressure reducer, and an evaporator are connected by pipes. The condenser includes a plurality of heat transfer tubes extending in an up-and-down direction, a first header having a tubular outer wall into which first ends of the plurality of heat transfer tubes are inserted, and a partition plate that is provided from a first end to a second end of the first header in a longitudinal direction, partitions an internal space of the first header into a high-pressure refrigerant passage where the first ends of the plurality of heat transfer tubes are disposed and a low-pressure refrigerant passage where the first ends of the plurality of heat transfer tubes are not disposed, and is configured to exchange heat between high-pressure refrigerant and low-pressure refrigerant in the first header.

17 Claims, 8 Drawing Sheets

(51) Int. Cl.
*F25B 39/00* (2006.01)
*F28D 1/04* (2006.01)
*F28D 1/053* (2006.01)
*F28D 7/00* (2006.01)
*F28F 1/12* (2006.01)
*F28F 9/02* (2006.01)

(52) U.S. Cl.
CPC ....... *F28D 1/05375* (2013.01); *F28D 7/0008* (2013.01); *F28F 9/0204* (2013.01); *F25B 13/00* (2013.01); *F25B 39/00* (2013.01); *F25B 2339/04* (2013.01); *F25B 2400/0409* (2013.01); *F25B 2400/054* (2013.01); *F25B 2400/13* (2013.01); *F25B 2500/18* (2013.01); *F28F 1/126* (2013.01); *F28F 2009/0287* (2013.01); *F28F 2009/0295* (2013.01)

(58) Field of Classification Search
CPC ............. F25B 2400/013; F28D 1/0417; F28D 1/0461; F28D 1/05375
See application file for complete search history.

(56) References Cited

U.S. PATENT DOCUMENTS

| | | | | |
|---|---|---|---|---|
| 6,539,746 | B1* | 4/2003 | Haussmann | F28D 1/0417 |
| | | | | 62/509 |
| 7,051,795 | B2* | 5/2006 | Kamiyama | F28D 1/0443 |
| | | | | 165/140 |
| 7,694,528 | B2* | 4/2010 | Nishida | F25B 39/04 |
| | | | | 165/172 |
| 10,281,217 | B2* | 5/2019 | Holmes | F28F 9/0224 |
| 11,441,826 | B2* | 9/2022 | Schreiber | F28D 5/02 |
| 11,885,540 | B2* | 1/2024 | Rahhal | F28D 7/0091 |
| 11,994,346 | B2* | 5/2024 | Wagner | F28D 1/05341 |
| 2004/0031596 | A1 | 2/2004 | Nishida et al. | |
| 2009/0019885 | A1* | 1/2009 | Hoshino | F28D 1/0417 |
| | | | | 165/181 |
| 2009/0178435 | A1* | 7/2009 | Hiyama | F25B 39/04 |
| | | | | 62/509 |
| 2020/0256625 | A1 | 8/2020 | Minami et al. | |

FOREIGN PATENT DOCUMENTS

| | | |
|---|---|---|
| JP | 2006-097911 A | 4/2006 |
| JP | 2009-143311 A | 7/2009 |
| JP | 2009-166529 A | 7/2009 |
| JP | 2009-222363 A | 10/2009 |
| JP | 2012-107775 A | 6/2012 |
| JP | 2017-032244 A | 2/2017 |
| JP | 2017-187256 A | 10/2017 |
| JP | 2020-153597 A | 9/2020 |
| WO | 2019/116413 A1 | 6/2019 |
| WO | 2021/245788 A1 | 12/2021 |

OTHER PUBLICATIONS

Notice of Reasons for Refusal mailed on May 17, 2022, received for JP Application 2022-512382, 12 pages including English Translation.

Extended European search report issued on Jul. 17, 2024, in corresponding European patent Application No. 21948282.5, 7 pages.

* cited by examiner

REFRIGERATION CYCLE APPARATUS

CROSS-REFERENCE TO RELATED APPLICATIONS

This application is based on PCT filing PCT/JP2021/024504, filed Jun. 29, 2021, the entire contents of which are incorporated herein by reference.

TECHNICAL FIELD

The present disclosure relates to a refrigeration cycle apparatus including a heat exchanger having headers.

BACKGROUND ART

Refrigeration cycle apparatuses such as air-conditioning apparatuses may include an internal heat exchanger to increase the degree of subcooling of liquid refrigerant flowing out of an outdoor heat exchanger during a cooling operation. In the case where the internal heat exchanger is provided separately from the outdoor heat exchanger, however, there are problems of a decrease in space efficiency and an increase in costs of the refrigeration cycle apparatus. In view of this, an outdoor heat exchanger including a double-pipe heat exchanger has been proposed (see, for example, Patent Literature 1). Patent Literature 1 discloses a header having a double-pipe structure including an outer pipe and an inner pipe disposed in the outer pipe. In Patent Literature 1, during the cooling operation of the refrigeration cycle apparatus, high-pressure refrigerant flows inside the outer pipe and outside the inner pipe, and low-pressure refrigerant flows inside the inner pipe.

CITATION LIST

Patent Literature

Patent Literature 1: Japanese Unexamined Patent Application Publication No. 2012-107775

SUMMARY OF INVENTION

Technical Problem

When a heat exchanger is installed with the longitudinal direction of a heat transfer tube being an up-and-down direction, phase separation may occur in a passage of high-pressure refrigerant inside a header so that two-phase gas-liquid refrigerant separates into a gas phase and a liquid phase. Therefore, liquid refrigerant may unevenly be present at a lower part due to the gravity. Alternatively, the liquid refrigerant may flow along the inner surface of the header and may unevenly be present near the inner wall inside the header. In the structure as in the header of Patent Literature 1 in which the inner pipe serving as a passage of low-pressure refrigerant is disposed inside the outer pipe serving as a passage of high-pressure refrigerant, the inner pipe and the liquid refrigerant hardly come into contact with each other when the liquid refrigerant is unevenly present near the inner surface of the outer pipe or at a lower part in the outer pipe in the passage of high-pressure refrigerant. When the heat exchanger is installed with the longitudinal direction of the heat transfer tube being the vertical direction in Patent Literature 1, the heat exchanger serving as a condenser during the cooling operation cannot sufficiently exchange heat between the low-pressure refrigerant and the high-pressure refrigerant, and the liquid refrigerant flowing out of the heat exchanger cannot have a sufficient degree of subcooling.

The present disclosure has been made to solve the problem described above and has an object to provide a refrigeration cycle apparatus in which liquid refrigerant flowing out of a condenser during a cooling operation can have a higher degree of subcooling than in the related art.

Solution to Problem

A refrigeration cycle apparatus according to an embodiment of the present disclosure includes a refrigerant circuit in which at least a compressor, a condenser, a first pressure reducer, and an evaporator are connected by pipes. The condenser includes a plurality of heat transfer tubes extending in an up-and-down direction, a first header having a tubular outer wall into which first ends of the plurality of heat transfer tubes are inserted, and a partition plate that is provided from a first end to a second end of the first header in a longitudinal direction, partitions an internal space of the first header into a high-pressure refrigerant passage where the first ends of the plurality of heat transfer tubes are disposed and a low-pressure refrigerant passage where the first ends of the plurality of heat transfer tubes are not disposed, and is configured to exchange heat between high-pressure refrigerant flowing through the high-pressure refrigerant passage and low-pressure refrigerant flowing through the low-pressure refrigerant passage in the first header.

Advantageous Effects of Invention

The refrigeration cycle apparatus according to the embodiment of the present disclosure includes the partition plate that partitions the internal space of the first header into the high-pressure refrigerant passage where the first ends of the plurality of heat transfer tubes are disposed and the low-pressure refrigerant passage where the first ends are not disposed. The partition plate is provided from the first end to the second end of the first header in the longitudinal direction, and exchanges heat between the high-pressure refrigerant and the low-pressure refrigerant. Therefore, even if phase separation occurs in the high-pressure refrigerant passage in the first header so that two-phase gas-liquid refrigerant separates into a gas phase and a liquid phase and the refrigerant in the liquid phase is unevenly present at a lower part due to the gravity, the refrigerant in the liquid phase and the partition plate can easily come into contact with each other because the high-pressure refrigerant passage is provided above the low-pressure refrigerant passage. Since the partition plate at the boundary of the high-pressure refrigerant passage and the low-pressure refrigerant passage and the refrigerant in the liquid phase in the high-pressure refrigerant passage can come into contact with each other more easily than in the related art, the low-pressure refrigerant and the high-pressure refrigerant in the heat exchanger can exchange heat more effectively than in the related art. As a result, in the refrigeration cycle apparatus according to the embodiment of the present disclosure, the liquid refrigerant flowing out of the condenser during the cooling operation can have a higher degree of subcooling than in the related art.

DESCRIPTION OF EMBODIMENTS

Embodiment 1

(Refrigeration Cycle Apparatus 1)

Figure 1:
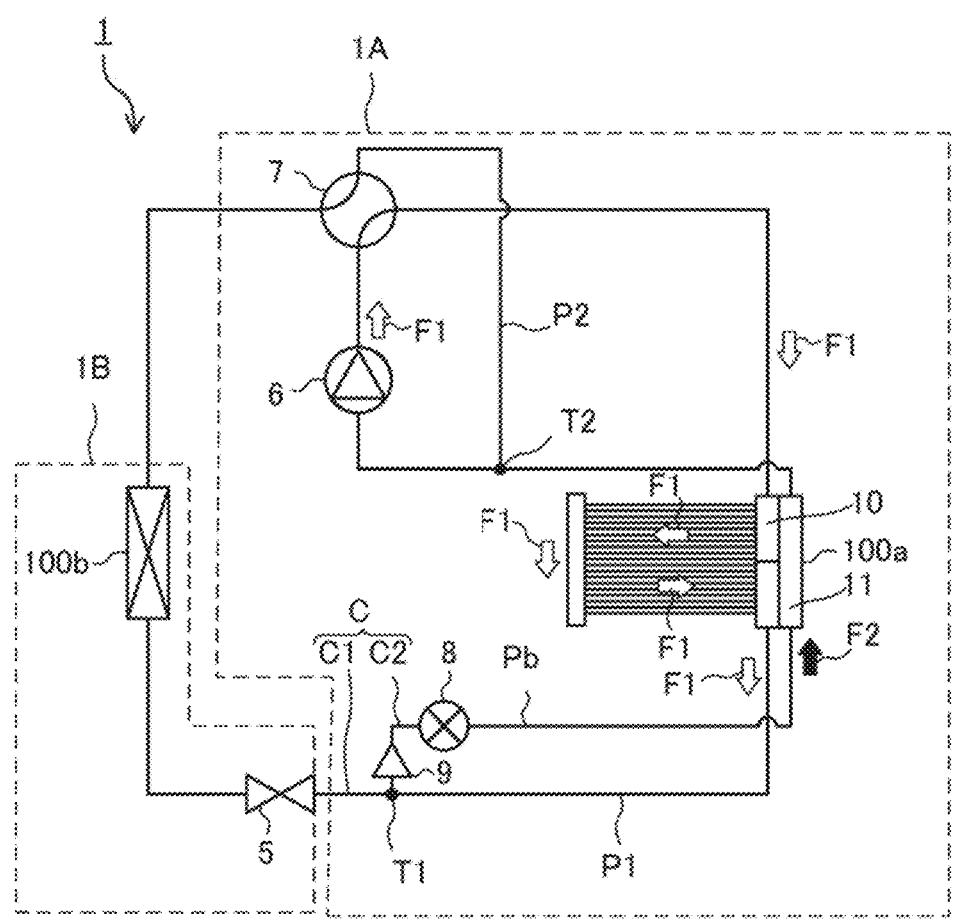
FIG. 1 is a refrigerant circuit diagram illustrating an example of a refrigeration cycle apparatus according to Embodiment 1.

FIG. 1 is a refrigerant circuit diagram illustrating an example of a refrigeration cycle apparatus 1 according to Embodiment 1. The refrigeration cycle apparatus 1 includes a refrigerant circuit C in which heat is transferred with latent heat of evaporation and condensation of refrigerant. Examples of the refrigeration cycle apparatus 1 include an air-conditioning apparatus in which a condenser is installed outdoors and an evaporator is installed indoors to cool a room, and a hot water supply system in which a condenser heats water into hot water.

(Refrigerant Circuit C)

The refrigerant circuit C includes a main circuit C1 including a compressor 6, and a bypass C2 branching from the main circuit C1.

(Main Circuit C1)

The main circuit C1 is formed such that the compressor 6, a first heat exchanger 100*a*, a first pressure reducer 5, and a second heat exchanger 100*b* are connected by pipes. The compressor 6 sucks and compresses low-pressure gas refrigerant into high-pressure gas refrigerant, and discharges the high-pressure gas refrigerant so that it circulates through the refrigerant circuit C. The first heat exchanger 100*a* and the second heat exchanger 100*b* exchange heat between refrigerant and air. Examples of the first pressure reducer 5 include an expansion valve that expands refrigerant to reduce pressure in the main circuit C1.

Examples of the compressor 6 include an inverter compressor that controls a sending volume per unit time by changing the operation frequency. With this structure of the compressor 6, the amount of refrigerant circulating through the refrigerant circuit C can be changed by adjustment of the frequency of the compressor 6. Therefore, the amount of heat transferred in a refrigeration cycle can be changed depending on, for example, a load. A valve whose opening degree can be changed continuously is used as the first pressure reducer 5 to change the pressure of the refrigerant circulating through the refrigerant circuit C.

In the example illustrated in FIG. 1, the main circuit C1 further includes a flow switching device 7. The flow switching device 7 switches passages of refrigerant discharged from the compressor 6, and examples thereof include a four-way valve. The structure of the refrigerant circuit C is not limited to the structure described above. For example, the flow switching device 7 may be omitted.

In the example illustrated in FIG. 1, the refrigeration cycle apparatus 1 includes an outdoor unit 1A installed outdoors, and an indoor unit 1B installed indoors, that is, in a space to be air-conditioned. In the example illustrated in FIG. 1, the compressor 6, the flow switching device 7, and the first heat exchanger 100*a* of the main circuit C1 and the bypass C2 are mounted on the outdoor unit 1A, and the first pressure reducer 5 and the second heat exchanger 100*b* that are the remainder of the main circuit C1 are mounted on the indoor unit 1B. The first pressure reducer 5 may be mounted on the outdoor unit 1A.

The flow switching device 7 switches cooling and heating. In the cooling operation, refrigerant discharged from the compressor 6 flows through the first heat exchanger 100*a*, the first pressure reducer 5, and the second heat exchanger 100*b* in this order and returns to the compressor 6. In the heating operation, refrigerant discharged from the compressor 6 flows through the second heat exchanger 100*b*, the first pressure reducer 5, and the first heat exchanger 100*a* in this order and returns to the compressor 6. That is, when the room is cooled, the first heat exchanger 100*a* functions as a condenser and the second heat exchanger 100*b* functions as an evaporator and, when the room is heated, the second heat exchanger 100*b* functions as the condenser and the first heat exchanger 100*a* functions as the evaporator. The condenser rejects heat of high-pressure gas refrigerant to outdoor air to condense the refrigerant into liquid refrigerant. The evaporator receives heat from outdoor air to liquid refrigerant contained in low-pressure refrigerant to evaporate the refrigerant into gas refrigerant.

The first heat exchanger 100*a* includes a high-pressure refrigerant passage 10 through which high-pressure refrigerant discharged from the compressor 6 flows, and a low-pressure refrigerant passage 11 through which low-pressure refrigerant having reduced pressure flows. In FIG. 1, an outline arrow F1 shows a flow of the high-pressure refrigerant discharged from the compressor 6 and flowing into the first heat exchanger 100*a*, and a solid arrow F2 shows a flow of the low-pressure refrigerant flowing into the low-pressure refrigerant passage 11 of the first heat exchanger 100*a*. The high-pressure refrigerant passage 10 of the first heat exchanger 100*a* is connected to the pipes of the main circuit C1 and constitutes the main circuit C1. The low-pressure refrigerant passage 11 of the first heat exchanger 100*a* is connected to pipes of the bypass C2 and constitutes the bypass C2.

(Bypass C2)

The bypass C2 includes a pipe (hereinafter referred to as "bypass pipe Pb"), a second pressure reducer 8 that is provided in the bypass pipe Pb and reduces the pressure of refrigerant, and a check valve 9 that regulates a refrigerant flow direction. In the example illustrated in FIG. 1, the bypass C2 branches from a pipe P1 connecting the first heat exchanger 100*a* and the first pressure reducer 5 in the main circuit C1, and joins a pipe P2 through which refrigerant returning from the second heat exchanger 100*b* to the compressor 6 flows in the main circuit C1.

The bypass pipe Pb connects the pipe P1 between the first heat exchanger 100a and the first pressure reducer 5 in the main circuit C1 and the pipe P2 between the second heat exchanger 100b and the compressor 6 in the main circuit C1. The check valve 9 is provided in the bypass pipe Pb near a branch point T1 from the main circuit C1, and prevents backflow of refrigerant to the main circuit C1.

Examples of the second pressure reducer 8 include a fixed fluid resistor that has a predetermined resistance to a fluid flow and reduces the pressure of fluid by reducing the flow rate. Specifically, the second pressure reducer 8 may be a narrow tube such as a capillary tube or an orifice having a narrow passage, or a bent tube having a bent passage.

The second pressure reducer 8 is provided separately from the first pressure reducer 5 of the main circuit C1. The first pressure reducer 5 reduces the pressure of refrigerant in the main circuit C1 and the refrigerant flows into the evaporator. The second pressure reducer 8 reduces the pressure of refrigerant in the bypass C2 and the refrigerant flows into the low-pressure refrigerant passage 11 of the condenser. The first pressure reducer 5 and the second pressure reducer 8 are the same in that both of them reduce the pressure of refrigerant, but the first pressure reducer 5 adjusts the heat exchange amount of the refrigerant in the evaporator, whereas the second pressure reducer 8 adjusts the degree of subcooling of the refrigerant flowing through the high-pressure refrigerant passage in the condenser.

The low-pressure refrigerant passage 11 of the first heat exchanger 100a is provided between the second pressure reducer 8 in the bypass C2 and a joining point T2 to the main circuit C1. Low-pressure refrigerant whose pressure is reduced by the second pressure reducer 8 after the refrigerant flows into the bypass pipe Pb via the branch point T1 flows into the low-pressure refrigerant passage 11.

The positional relationship between the check valve 9 and the second pressure reducer 8 in the bypass C2 may be changed. Although description is herein made about the exemplary case where the second pressure reducer 8 and the check valve 9 are used, a flow regulating valve or other devices that can adjust the fluid resistance as appropriate may be used instead. The resistance in the passage of the bypass C2 is larger than the resistance in the passage of the pipe of the main circuit C1 by the second pressure reducer 8, and adjustment is made so that a majority of the refrigerant flows through the main circuit C1 and a smaller amount of refrigerant than that of the refrigerant flowing through the main circuit C1 flows through the bypass C2.

Figure 2:
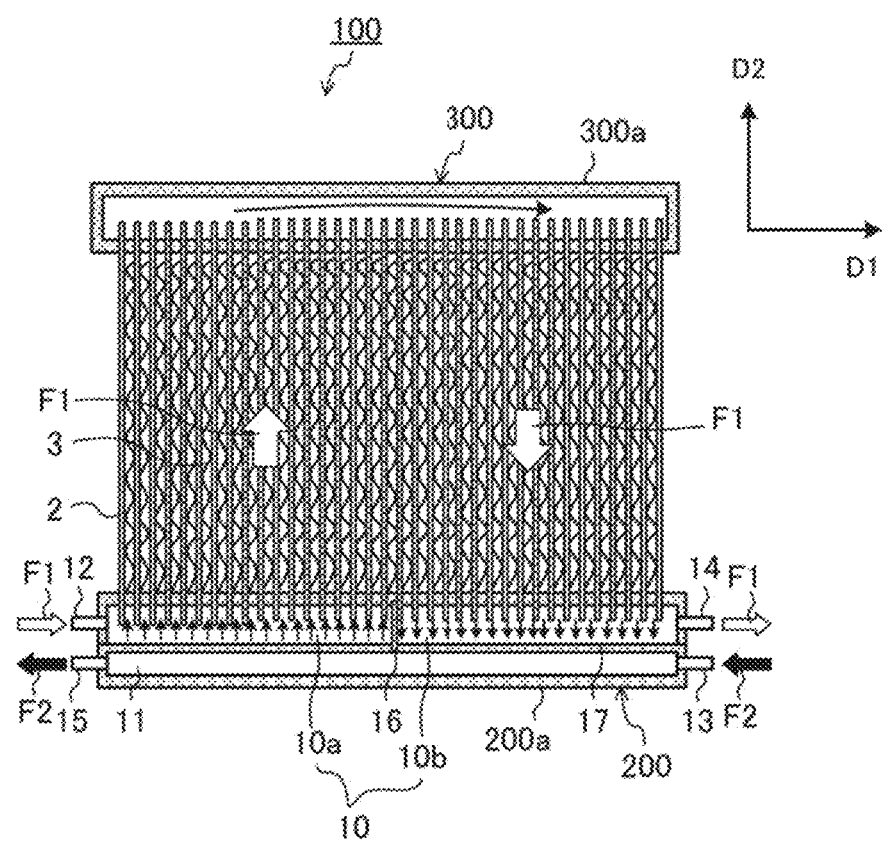
FIG. 2 is a schematic diagram illustrating an example of a first heat exchanger of the refrigeration cycle apparatus according to Embodiment 1.

FIG. 2 is a schematic diagram illustrating an example of the first heat exchanger 100a of the refrigeration cycle apparatus 1 according to Embodiment 1. The structure of the first heat exchanger 100a serving as the condenser during the cooling operation is described below in detail with reference to FIG. 2. In the following description, the first heat exchanger 100a may be referred to simply as "heat exchanger 100".

As illustrated in FIG. 2, the heat exchanger 100 includes a plurality of heat transfer tubes 2 and a plurality of fins 3 extending in an up-and-down direction, a tubular first header 200 disposed below the heat transfer tubes 2 and the fins 3 and extending in a lateral direction, and a tubular second header 300 disposed above the heat transfer tubes 2 and the fins 3 and extending in the lateral direction.

In the following description, terms of directions (for example, "up", "down", "right", "left", "front", and "rear") are used as appropriate for facilitating understanding. Those terms are used for the description but do not limit the present disclosure. The terms of directions mean the directions under the assumption that the heat exchanger 100 is viewed from the front side (front face) as illustrated in FIG. 2 unless otherwise noted. Two orthogonal directions are defined as "first direction D1" and "second direction D2". The first direction D1 may be the longitudinal direction of the first header 200 or the second header 300 of the heat exchanger 100, that is, the lateral direction, and the second direction D2 may be the longitudinal direction of the heat transfer tube 2, that is, the up-and-down direction.

The plurality of heat transfer tubes 2 is arranged at predetermined intervals in the first direction D1. Examples of the heat transfer tube 2 include a flat tube. Both ends of the plurality of heat transfer tubes 2 in the longitudinal direction are connected to the first header and the second header 300 at the top and bottom of the heat exchanger 100. In the example illustrated in FIG. 2, the lower ends of the plurality of heat transfer tubes 2 are inserted into an outer wall 200a of the first header 200, and the upper ends of the plurality of heat transfer tubes 2 are inserted into an outer wall 300a of the second header 300.

Examples of each of the plurality of fins 3 include a corrugated fin having a waveform. Each fin 3 is disposed between adjacent heat transfer tubes 2 and joined to the surfaces of both the heat transfer tubes 2. The fin 3 transfers heat to the heat transfer tube 2 to improve the efficiency of heat exchange between air and refrigerant.

The first header 200 has the tubular outer wall 200a and has an internal space through which refrigerant flows. The second header 300 has the tubular outer wall 300a and has an internal space through which refrigerant flows. The internal space of the first header 200 and the internal space of the second header 300 communicate with each other via the plurality of heat transfer tubes 2. The first header 200 and the second header 300 distribute refrigerant and join streams of refrigerant.

The first header 200 includes a partition plate 17 that separates the internal space of the first header 200 in the second direction D2. In other words, the partition plate 17 extends along an axial direction of the first header 200 (first direction D1) and partitions the inside in the axial direction. The partition plate 17 is provided from a first end to a second end of the first header 200 in the longitudinal direction, and partitions the internal space of the first header 200 into a space where the lower ends of the plurality of heat transfer tubes are disposed and a space where the lower ends of the plurality of heat transfer tubes are not disposed. In the two spaces separated by the partition plate 17, the space where the lower ends of the plurality of heat transfer tubes are disposed is the high-pressure refrigerant passage 10 described above, and the space where the lower ends of the plurality of heat transfer tubes are not disposed is the low-pressure refrigerant passage 11 described above.

In the first header 200, the high-pressure refrigerant flowing through the high-pressure refrigerant passage 10 and the low-pressure refrigerant flowing through the low-pressure refrigerant passage 11 exchange heat via the partition plate 17. Therefore, the partition plate 17 is desirably made of a metal material such as aluminum with good thermal conductivity.

The plurality of heat transfer tubes 2, the plurality of fins 3, the first header 200, and the second header 300 can be made of aluminum, and are joined together by, for example, brazing in this case.

The heat exchanger 100 has a high-pressure refrigerant inlet 12 for the high-pressure refrigerant to the high-pressure refrigerant passage 10, and a high-pressure refrigerant outlet 14 for the high-pressure refrigerant from the high-pressure refrigerant passage 10. The heat exchanger 100 has a low-pressure refrigerant inlet 13 for the low-pressure refrigerant to the low-pressure refrigerant passage 11, and a low-pressure refrigerant outlet 15 for the low-pressure refrigerant from the low-pressure refrigerant passage 11. In the example illustrated in FIG. 2, the high-pressure refrigerant inlet 12, the high-pressure refrigerant outlet 14, the low-pressure refrigerant inlet 13, and the low-pressure refrigerant outlet 15 are provided to the first header 200, and the high-pressure refrigerant inlet 12 and the high-pressure refrigerant outlet 14 are provided above the low-pressure refrigerant inlet 13 and the low-pressure refrigerant outlet 15.

The high-pressure refrigerant passage 10 is provided in the main circuit C1 illustrated in FIG. 1. During the cooling operation, high-temperature and high-pressure gas refrigerant from the compressor 6 flows into the heat exchanger 100 via the high-pressure refrigerant inlet 12, and low-temperature and high-pressure liquid refrigerant after heat exchange flows out of the heat exchanger 100 via the high-pressure refrigerant outlet 14. The low-pressure refrigerant passage 11 is provided in the bypass C2 illustrated in FIG. 1. During the cooling operation, low-pressure refrigerant whose pressure is reduced by the second pressure reducer 8 flows into the heat exchanger 100 via the low-pressure refrigerant inlet 13, and flows out of the heat exchanger 100 via the low-pressure refrigerant outlet 15 after heat exchange via the partition plate 17.

The first header 200 includes a high-pressure partition 16 that separates the high-pressure refrigerant passage 10 in the longitudinal direction of the first header 200, that is, the first direction D1. The high-pressure partition 16 is provided in the high-pressure refrigerant passage 10, and partitions the high-pressure refrigerant passage 10 into a left high-pressure refrigerant passage 10a near the high-pressure refrigerant inlet 12 and a right high-pressure refrigerant passage 10b near the high-pressure refrigerant outlet 14.

In the example illustrated in FIG. 2, the high-pressure refrigerant inlet 12 and the low-pressure refrigerant outlet 15 are provided at the first end of the first header 200 in the longitudinal direction, that is, at the left, and the high-pressure refrigerant outlet 14 and the low-pressure refrigerant inlet 13 are provided at the second end of the first header 200 in the longitudinal direction, that is, at the right. With this structure, the high-pressure refrigerant flows from left to right in the first header 200 as shown by the outline arrows F1 in the high-pressure refrigerant passage 10 in the internal space of the first header 200. In the low-pressure refrigerant passage 11, the low-pressure refrigerant flows from right to left in the first header 200 as shown by the solid arrows F2. Therefore, the high-pressure refrigerant and the low-pressure refrigerant become counterflows. Since the high-pressure refrigerant and the low-pressure refrigerant are counterflows, heat can be exchanged more efficiently than in a case of parallel flows.

In the heat exchanger 100, either or both of the high-pressure refrigerant inlet 12 and the high-pressure refrigerant outlet 14 may be provided to the second header 300. However, the high-pressure refrigerant outlet 14 is preferably provided to the first header 200 including the partition plate 17 out of the first header 200 and the second header 300 as illustrated in FIG. 2. The reason is described below.

The refrigeration cycle apparatus 1 (see FIG. 1) includes a fan (not illustrated) that supplies outdoor air to the heat exchanger 100. The outdoor air supplied by the fan flows through spaces defined by the fin 3 and the heat transfer tubes 2 between adjacent heat transfer tubes 2 in the heat exchanger 100. Specifically, the outdoor air passes through the heat exchanger 100 in a direction orthogonal to both the first direction D1 and the second direction D2, that is, from the near side to the far side of the drawing sheet of FIG. 2. The high-temperature and high-pressure gas refrigerant flowing into the heat exchanger 100 is cooled while passing through the heat transfer tubes 2 and turns into liquid refrigerant behind the high-pressure refrigerant outlet 14. In the heat exchanger 100 of the present disclosure, the liquid refrigerant is further cooled in the right high-pressure refrigerant passage 10b near the high-pressure refrigerant outlet 14 by heat exchange with the low-pressure refrigerant via the partition plate 17 even if the liquid refrigerant having passed through the heat transfer tubes 2 is not sufficiently cooled. Therefore, the high-pressure refrigerant has the degree of subcooling by being further condensed in the right high-pressure refrigerant passage 10b after passing through the heat transfer tubes 2. Thus, the refrigerant need not sufficiently be cooled only through the heat transfer tubes 2. Accordingly, when the high-pressure refrigerant flows through the heat transfer tubes 2 in the heat exchanger 100, the refrigerant may contain, at a high ratio, two-phase gas-liquid refrigerant that is most efficient in the heat exchange with the outdoor air. Since the refrigerant does not turn completely into the liquid refrigerant in the heat transfer tubes 2, the heat exchange amount can be increased in the heat transfer tubes 2.

The partition plate 17, the high-pressure refrigerant passage 10, and the low-pressure refrigerant passage 11 of the first header 200 are described below in detail.

Figure 3:
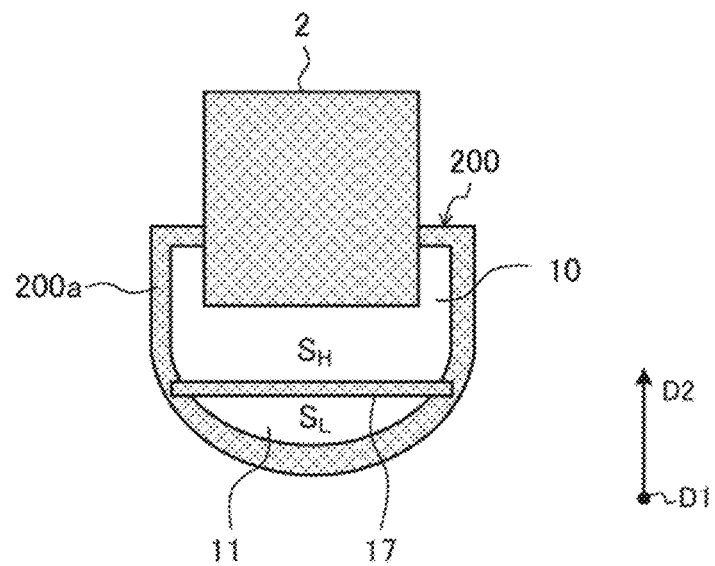
FIG. 3 is a sectional view of a first header of the first heat exchanger in FIG. 2 that is viewed in a first direction.

FIG. 3 is a sectional view of the first header 200 of the first heat exchanger 100a in FIG. 2 that is viewed in the first direction D1. The partition plate 17 has a substantially rectangular shape in plan view with its longitudinal direction being the first direction D1. Both end surfaces extending in the longitudinal direction are connected to the inner surface of the outer wall 200a of the first header 200.

As illustrated in FIG. 3, the partition plate 17 is disposed so that a passage sectional area $S_H$ of the high-pressure refrigerant passage 10 is larger than a passage sectional area $S_L$ of the low-pressure refrigerant passage 11 in the longitudinal direction of the first header 200. With this structure, phase separation of the low-pressure refrigerant into the gas phase and the liquid phase can be suppressed in the low-pressure refrigerant passage 11 in which the passage sectional area $S_L$ is small and the flow rate is low. Therefore, heat is exchanged more efficiently with the high-pressure refrigerant via the partition plate 17. When the phase separation has occurred in the low-pressure refrigerant, the low-pressure refrigerant in the liquid phase is unevenly present at a lower part due to the gravity, and heat is hardly exchanged with the high-pressure refrigerant flowing through the high-pressure refrigerant passage 10 via the partition plate 17.

Figure 4:
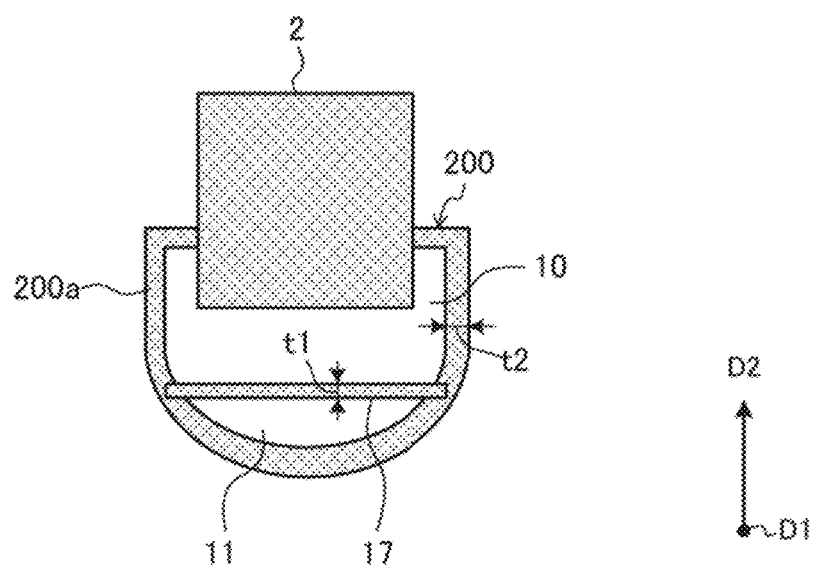
FIG. 4 is a schematic diagram illustrating a relationship between the thickness of an outer wall and the thickness of a partition plate in the first header in FIG. 3.

FIG. 4 is a schematic diagram illustrating a relationship between a thickness t2 of the outer wall 200a and a thickness t1 of the partition plate 17 in the first header 200 in FIG. 3. In the example illustrated in FIG. 4, the outer wall 200a of the first header 200 has the thickness t2 that is substantially constant. The thickness t1 of the partition plate 17 that partitions the high-pressure refrigerant passage 10 and the low-pressure refrigerant passage 11 is smaller than the thickness t2 of the outer wall 200a of the first header 200. Since the thickness t1 of the partition plate 17 is determined as described above, the heat of both the high-pressure refrigerant and the low-pressure refrigerant is transferred to the partition plate 17 more easily than the outer wall 200a, and the heat exchange between the high-pressure refrigerant and the low-pressure refrigerant via the partition plate 17 is promoted. Thus, when the heat exchanger 100 functions as the condenser, the high-pressure refrigerant can easily have the degree of subcooling at the condenser outlet. Since the two-phase gas-liquid region is expanded in the condenser, the condensation performance can be improved. Since the thickness t1 of the partition plate 17 is small, the cost increase caused by the partition plate 17 can be suppressed. Since the refrigerant flows on both sides of the partition plate 17, pressure unevenness between the two surfaces of the partition plate 17 can be suppressed. Thus, required withstand pressure may be low and no problem arises even when the thickness t1 is reduced.

The structure of the heat exchanger 100 is not limited to the above. For example, the high-pressure refrigerant flowing into the high-pressure refrigerant passage 10 of the heat exchanger 100 is not limited to the high-pressure single-phase gas refrigerant, and may be high-pressure two-phase gas-liquid refrigerant. In the heat exchanger 100, the fluid that exchanges heat with the refrigerant may be a fluid other than air. The fins 3 may be omitted because heat is exchanged between the air and the refrigerant by the heat transfer tubes 2. The high-pressure partition 16 may be omitted or a plurality of high-pressure partitions 16 may be provided in the first header 200. In the case where the high-pressure partition 16 is omitted, the high-pressure refrigerant passage 10 and the low-pressure refrigerant passage 11 of the first header 200 can be provided continuously from the first end to the second end in the longitudinal direction. Therefore, the first header 200 can be manufactured by extrusion or other methods and the manufacture is facilitated. The second header 300 may include the high-pressure partition 16 at a position different in the first direction D1 from the position of the high-pressure partition 16 in the first header 200 so that the high-pressure refrigerant in the heat exchanger 100 flows through a passage folded multiple times. The second header 300 may include the partition plate 17 similarly to the first header 200. Modifications are described below.

Figure 5:
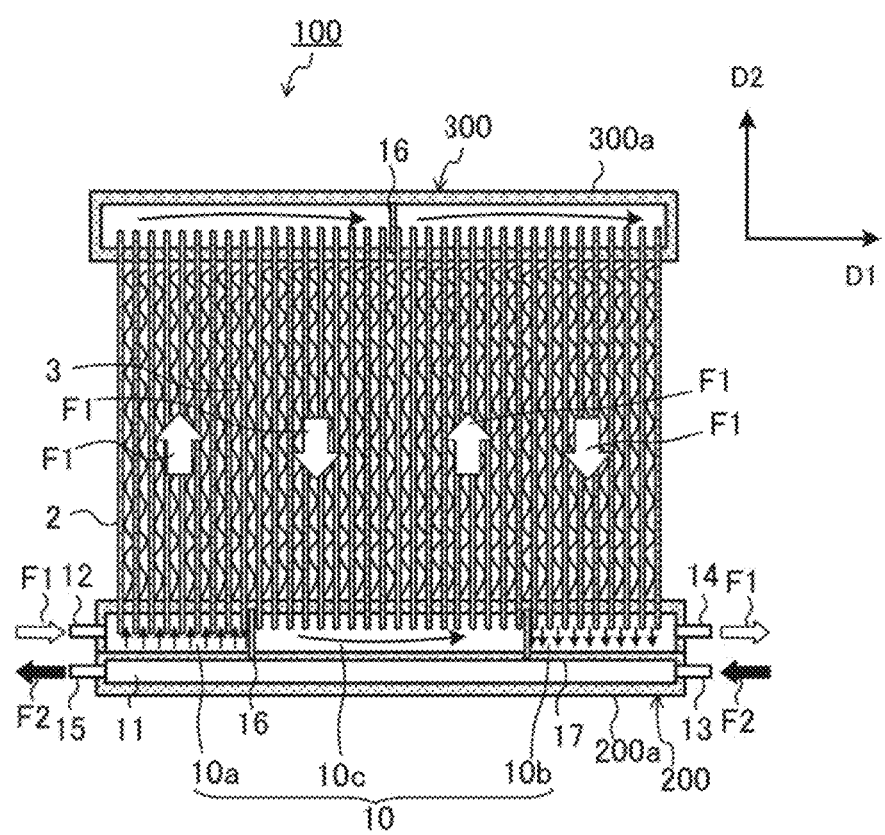
FIG. 5 is a schematic diagram illustrating Modification 1 of the heat exchanger in FIG. 2.

FIG. 5 is a schematic diagram illustrating Modification 1 of the heat exchanger in FIG. 2. As illustrated in FIG. 5, a plurality of high-pressure partitions 16 is provided in Modification 1. Specifically, the first header 200 includes two high-pressure partitions 16, and the second header 300 includes one high-pressure partition 16. The high-pressure refrigerant passage 10 of the first header 200 is separated by the two high-pressure partitions 16 into three passages that are the left high-pressure refrigerant passage 10a, a central high-pressure refrigerant passage 10c, and the right high-pressure refrigerant passage 10b, and the internal space of the second header 300 is separated by the one high-pressure partition 16 into two right and left spaces.

In Modification 1, the high-pressure refrigerant flowing into the heat exchanger 100 through the high-pressure refrigerant inlet 12 first flows into the left high-pressure refrigerant passage 10a of the first header 200 and flows into the left space in the second header 300 through the plurality of heat transfer tubes 2 connected to the left high-pressure refrigerant passage 10a, and the streams join together. The high-pressure refrigerant flowing into the left space in the second header 300 flows into the central high-pressure refrigerant passage 10c of the first header 200 through a plurality of left heat transfer tubes among the plurality of heat transfer tubes connected to the central high-pressure refrigerant passage 10c of the first header 200, and the streams join together. Then, the high-pressure refrigerant flows into the right space in the second header 300 through a plurality of right heat transfer tubes among the plurality of heat transfer tubes connected to the central high-pressure refrigerant passage 10c of the first header 200, and the streams join together. The high-pressure refrigerant flowing into the right space in the second header 300 flows into the right high-pressure refrigerant passage 10b of the first header 200 through the plurality of heat transfer tubes connected to the right high-pressure refrigerant passage 10b of the first header 200, and the streams join together. In this way, the plurality of high-pressure partitions 16 can provide a path along which the high-pressure refrigerant flows to and from the first header 200 and the second header 300 depending on the number of high-pressure partitions 16 and flows out through the high-pressure refrigerant outlet 14.

The positions of the high-pressure refrigerant inlet 12 and the high-pressure refrigerant outlet 14 may be determined as appropriate depending on the number of high-pressure partitions 16 provided in the first header 200 and the number of high-pressure partitions 16 provided in the second header 300.

Figure 6:
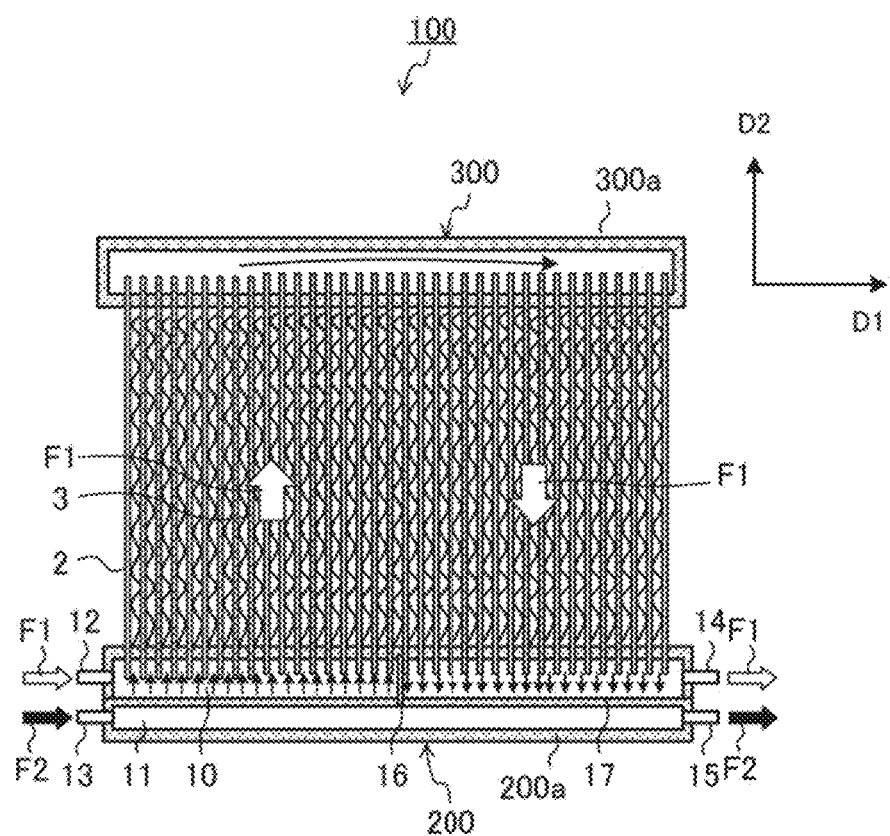
FIG. 6 is a schematic diagram illustrating Modification 2 of the heat exchanger in FIG. 2.

FIG. 6 is a schematic diagram illustrating Modification 2 of the heat exchanger in FIG. 2. As illustrated in FIG. 6, the high-pressure refrigerant inlet 12 and the low-pressure refrigerant inlet 13 in Modification 2 are provided at the one same end of the first header 200 in the longitudinal direction, that is, at the left. In Modification 2, the high-pressure refrigerant outlet 14 and the low-pressure refrigerant outlet 15 are provided at the second end of the first header 200 in the longitudinal direction, that is, at the right.

Since the high-pressure refrigerant inlet 12 and the low-pressure refrigerant inlet 13 are provided on the same side in the longitudinal direction of the first header 200, the high-pressure refrigerant and the low-pressure refrigerant flowing through the first header become parallel flows in the same direction. Therefore, counterflows or parallel flows can be selected as appropriate when the heat exchanger 100 is connected to the refrigerant circuit C illustrated in FIG. 1. Thus, the versatility of the circuit structure increases.

Figure 7:
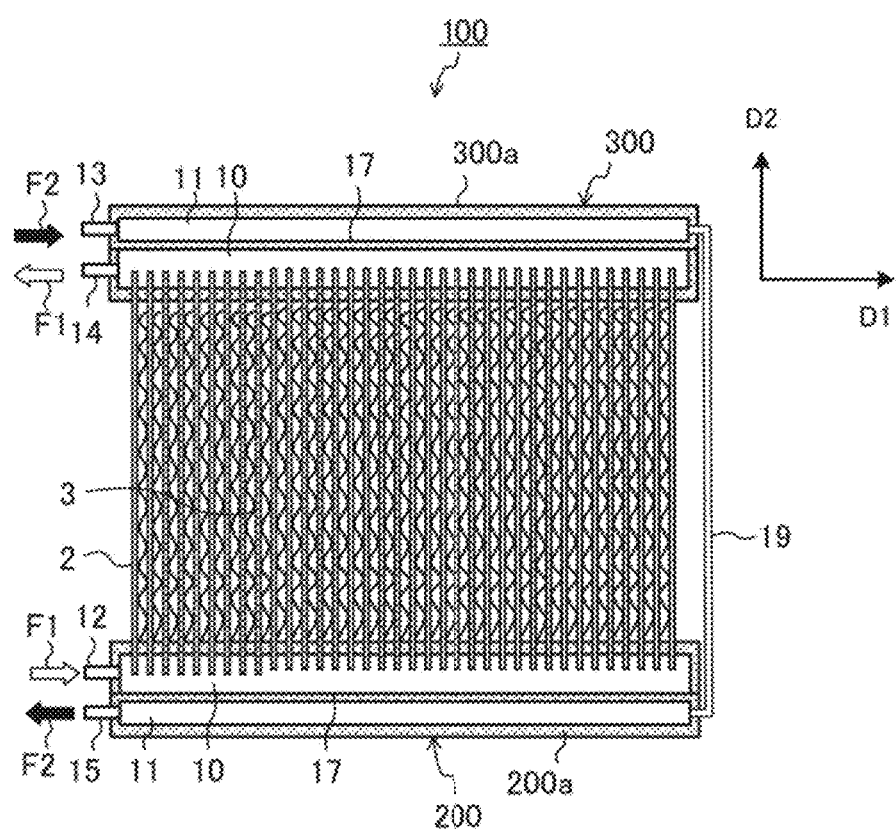
FIG. 7 is a schematic diagram illustrating Modification 3 of the heat exchanger in FIG. 2.

FIG. 7 is a schematic diagram illustrating Modification 3 of the heat exchanger in FIG. 2. As illustrated in FIG. 7, the second header 300 in Modification 3 includes the partition plate 17 similarly to the first header 200, and the partition plate 17 partitions the internal space of the second header 300 into the high-pressure refrigerant passage 10 and the low-pressure refrigerant passage 11. The high-pressure refrigerant inlet 12 is provided at the first end of the first header 200 in the longitudinal direction, that is, at the left, and the high-pressure refrigerant outlet 14 is provided at a first end of the second header 300 in the longitudinal direction, that is, at the left. The heat exchanger 100 includes a connection pipe 19 connecting the first header 200 and the second header 300. Through the connection pipe 19, the low-pressure refrigerant passage 11 of the first header 200 communicates with the low-pressure refrigerant passage 11 of the second header 300. The low-pressure refrigerant inlet 13 is provided at the first end of the second header 300 in the longitudinal direction, that is, at the left, and the low-pressure refrigerant outlet 15 is provided at the first end of the first header 200 in the longitudinal direction, that is, at the left.

With this structure, the refrigerant inlets and outlets such as the high-pressure refrigerant inlet 12, the high-pressure refrigerant outlet 14, the low-pressure refrigerant inlet 13, and the low-pressure refrigerant outlet 15 can collectively be provided on the same side of the heat exchanger 100. Therefore, complicated piping can be prevented when the heat exchanger 100 is connected to the refrigerant circuit C during installation of the refrigeration cycle apparatus 1. Thus, pipe connection is facilitated when the heat exchanger 100 is mounted on, for example, the outdoor unit of the refrigeration cycle apparatus such as a room air conditioner or a package air conditioner, and compactness is excellent.

Next, operations of the refrigeration cycle apparatus 1 during the cooling operation are described with reference to FIG. 1 and FIG. 2. As illustrated in FIG. 1, the high-temperature and high-pressure gas refrigerant discharged from the compressor 6 flows into the first heat exchanger 100a via the flow switching device 7. The high-temperature and high-pressure gas refrigerant flowing into the first heat exchanger 100a is condensed into low-temperature and high-pressure liquid refrigerant while rejecting heat by heat exchange with outdoor air, and flows out of the first heat exchanger 100a. A majority of the low-temperature and high-pressure liquid refrigerant flowing out of the first heat exchanger 100a flows into the first pressure reducer 5 of the main circuit C1 and the pressure is reduced by the first pressure reducer 5 so that the refrigerant turns into low-temperature and low-pressure two-phase gas-liquid or liquid refrigerant, and the refrigerant flows into the second heat exchanger 100b. The low-temperature and low-pressure two-phase gas-liquid or liquid refrigerant flowing into the second heat exchanger 100b is evaporated while receiving heat by heat exchange with indoor air to cool the indoor air and turn into low-temperature and low-pressure gas refrigerant, and flows out of the second heat exchanger 100b. The low-temperature and low-pressure gas refrigerant flowing out of the second heat exchanger 100b joins low-temperature and low-pressure gas refrigerant from the bypass C2 at the joining point T2. Then, the refrigerant is sucked into the compressor 6 and turns into high-temperature and high-pressure gas refrigerant again.

The remainder of the low-temperature and high-pressure liquid refrigerant flowing out of the first heat exchanger 100a in the main circuit C1 flows into the bypass C2. The low-temperature and high-pressure liquid refrigerant flowing into the bypass C2 flows into the second pressure reducer 8 via the check valve 9 and the pressure is reduced by the second pressure reducer 8 so that the refrigerant turns into low-temperature and low-pressure two-phase gas-liquid refrigerant, and the refrigerant flows into the low-pressure refrigerant passage 11 of the first heat exchanger 100a. As illustrated in FIG. 2, the low-temperature and low-pressure two-phase gas-liquid refrigerant flowing into the low-pressure refrigerant passage 11 of the first heat exchanger 100a exchanges heat with the high-pressure refrigerant flowing through the high-pressure refrigerant passage 10 in the first header 200 via the partition plate 17. At this time, the low-temperature and low-pressure two-phase gas-liquid refrigerant flowing through the low-pressure refrigerant passage 11 is subcooled into low-temperature and low-pressure gas refrigerant by receiving heat from the high-pressure refrigerant, and flows out of the first heat exchanger 100a. The low-temperature and low-pressure gas refrigerant flowing out of the low-pressure refrigerant passage 11 of the first heat exchanger 100a in the bypass C2 joins the low-temperature and low-pressure gas refrigerant flowing out of the second heat exchanger 100b of the main circuit C1 at the joining point T2.

During the cooling operation of the refrigeration cycle apparatus 1 of the present disclosure, a part of the refrigerant flowing through the main circuit C1 branches behind the first pressure reducer 5 and the amount of refrigerant flowing into the evaporator (second heat exchanger 100b) decreases. Therefore, in a case where refrigerant having a large pressure loss is used or in an operation condition in which the load changes greatly, a decrease in performance due to an increase in the pressure loss at the evaporator can be suppressed.

As described above, the refrigeration cycle apparatus 1 of Embodiment 1 includes the refrigerant circuit C in which at least the compressor 6, the condenser (first heat exchanger 100a), the first pressure reducer 5, and the evaporator (second heat exchanger 100b) are connected by the pipes. The condenser includes the plurality of heat transfer tubes 2 extending in the up-and-down direction (second direction D2), and the first header 200 having the tubular outer wall 200a into which the first ends of the plurality of heat transfer tubes 2 are inserted. The condenser includes the partition plate 17 that is provided from the first end to the second end of the first header 200 in the longitudinal direction (first direction D1) and partitions the internal space of the first header 200. The partition plate 17 partitions the internal space of the first header 200 into the high-pressure refrigerant passage 10 where the first ends of the plurality of heat transfer tubes 2 are disposed and the low-pressure refrigerant passage 11 where the first ends of the plurality of heat transfer tubes 2 are not disposed. The partition plate 17 exchanges heat between the high-pressure refrigerant flowing through the high-pressure refrigerant passage 10 and the low-pressure refrigerant flowing through the low-pressure refrigerant passage 11 in the first header 200.

Thus, the contact area between the partition plate 17 at the boundary of the high-pressure refrigerant passage 10 and the low-pressure refrigerant passage 11 and the liquid refrigerant in the high-pressure refrigerant passage 10 becomes larger than in the related art, and the low-pressure refrigerant and the high-pressure refrigerant in the heat exchanger 100 can exchange heat more effectively than in the related art. As a result, in the refrigeration cycle apparatus 1 according to the present disclosure, the liquid refrigerant flowing out of the condenser (first heat exchanger 100a) during the cooling operation can have a higher degree of subcooling than in the related art.

The passage sectional area $S_H$ of the high-pressure refrigerant passage 10 is larger than the passage sectional area $S_L$ of the low-pressure refrigerant passage 11 in the longitudinal direction of the first header 200. Therefore, the phase separation of the low-pressure refrigerant into the gas phase and the liquid phase can be suppressed in the low-pressure refrigerant passage 11 in which the passage sectional area $S_L$ is small and the flow rate is low. Thus, heat is exchanged more efficiently with the high-pressure refrigerant via the partition plate 17.

The inlet of the high-pressure refrigerant passage 10 (high-pressure refrigerant inlet 12) is provided at the first end of the first header 200 in the longitudinal direction, and the inlet of the low-pressure refrigerant passage 11 (low-pressure refrigerant inlet 13) is provided at the second end of the first header 200 in the longitudinal direction. Therefore, the high-pressure refrigerant and the low-pressure refrigerant become counterflows, and heat can be exchanged more efficiently than in a case of parallel flows.

The inlet of the high-pressure refrigerant passage 10 and the inlet of the low-pressure refrigerant passage 11 are provided at the one same end of the first header 200 in the longitudinal direction. Therefore, the high-pressure refrigerant and the low-pressure refrigerant flowing through the first header 200 become parallel flows, and counterflows or parallel flows can be selected as appropriate when the heat exchanger 100 is connected to the refrigerant circuit C. Thus, the versatility of the circuit structure increases.

The thickness t1 of the partition plate 17 is smaller than the thickness t2 of the outer wall 200a of the first header 200. Since the thickness t1 of the partition plate 17 is determined, heat is transferred to the partition plate 17 more easily than the outer wall 200a, and the heat exchange between the high-pressure refrigerant and the low-pressure refrigerant via the partition plate 17 is promoted. Thus, when the heat exchanger 100 functions as the condenser, the high-pressure refrigerant can easily have the degree of subcooling at the condenser outlet. Since the thickness t1 of the partition plate 17 is small, the cost increase caused by the partition plate 17 can be suppressed.

In the condenser (first heat exchanger 100a), the outlet of the high-pressure refrigerant (high-pressure refrigerant outlet 14) in the condenser is provided to the first header 200 including the partition plate 17. Therefore, the high-pressure refrigerant need not completely turn into the liquid refrigerant when flowing into the first header 200 from the heat transfer tubes 2. The refrigerant turns into the two-phase gas-liquid refrigerant when flowing into the first header 200. Thus, the heat exchange is facilitated in the heat transfer tubes 2, and the condensation performance of the condenser can be improved.

The refrigeration cycle apparatus 1 includes the tubular second header 300 into which the second ends of the plurality of heat transfer tubes 2 are inserted, and the partition plate 17 that partitions the internal space of the second header 300 into the high-pressure refrigerant passage 10 and the low-pressure refrigerant passage 11. The condenser includes the connection pipe 19 through which the low-pressure refrigerant passage 11 of the first header 200 communicates with the low-pressure refrigerant passage 11 of the second header 300. Therefore, the amount of heat exchange between the high-pressure refrigerant and the low-pressure refrigerant can be increased, and the piping is not complicated during connection to the refrigerant circuit C.

The two-phase gas-liquid or single-phase gas refrigerant flows into the high-pressure refrigerant passage 10 of the condenser, and the condenser condenses the refrigerant flowing into the high-pressure refrigerant passage 10 so that the refrigerant turns into the liquid refrigerant. Therefore, versatility can be secured for the structure of the refrigerant circuit C and the type of the refrigerant.

The refrigeration cycle apparatus 1 includes the main circuit C1 in which at least the compressor 6, the condenser, the first pressure reducer 5, and the evaporator are connected by the pipes, and the bypass C2 branching from the main circuit C1. The bypass C2 includes the bypass pipe Pb connecting the pipe P1 between the condenser and the first pressure reducer 5 in the main circuit C1 and the pipe P2 between the evaporator and the compressor 6 in the main circuit C1. The bypass C2 includes the second pressure reducer 8 that is provided in the bypass pipe Pb and reduces the pressure of the refrigerant. The high-pressure refrigerant passage 10 of the condenser is connected to the pipes of the main circuit C1 and constitutes the main circuit C1, and the low-pressure refrigerant passage 11 of the condenser is connected between the second pressure reducer 8 in the bypass pipe Pb and the compressor 6 and constitutes the bypass C2.

During the cooling operation of the refrigeration cycle apparatus 1, a part of the refrigerant flowing through the main circuit C1 branches behind the first pressure reducer 5 and the amount of refrigerant flowing into the evaporator (second heat exchanger 100b) decreases. Therefore, in a case where refrigerant having a large pressure loss is used or in an operation condition in which the load changes greatly, a decrease in performance due to an increase in the pressure loss at the evaporator can be suppressed.

Embodiment 2

Figure 8:
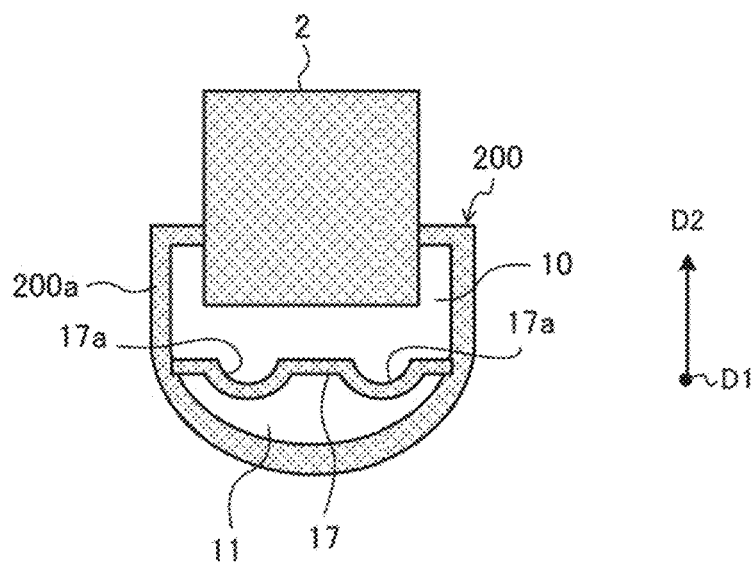
FIG. 8 is a sectional view illustrating the structure of a first header of a heat exchanger of a refrigeration cycle apparatus according to Embodiment 2.

FIG. 8 is a sectional view illustrating the structure of a first header 200 of a heat exchanger of a refrigeration cycle apparatus according to Embodiment 2. Embodiment 2 differs from Embodiment 1 in terms of the shape of the partition plate 17, and the other structures are similar to those in Embodiment 1. In Embodiment 2, the same parts as those in Embodiment 1 are represented by the same reference signs, and differences from Embodiment 1 are mainly described.

In Embodiment 2, the partition plate 17 has a substantially rectangular shape in plan view with its longitudinal direction being the first direction D1 and both end surfaces extending in the longitudinal direction are connected to the inner surface of the outer wall 200a of the first header 200 similarly to Embodiment 1.

As illustrated in FIG. 8, the partition plate 17 in Embodiment 2 has recesses 17a on the upper surface near the high-pressure refrigerant passage 10. Specifically, the recess 17a of the partition plate 17 is shaped such that the upper surface of the partition plate 17 recedes and the lower surface of the partition plate 17 projects. The recess 17a extends in the longitudinal direction of the partition plate 17, for example, from the first end to the second end of the partition plate 17 in the longitudinal direction. In the example illustrated in FIG. 8, the substantially semicircular recesses 17a are provided at two parts in a transverse direction of the partition plate 17.

The shapes of the upper surface and the lower surface of the partition plate 17 are not limited to the shapes described above. The partition plate 17 may have at least one of at least one downward recess and at least one upward projection so that the surface area is increased. For example, the partition plate 17 may have three or more recesses or projections, have a waveform, or have a dimple structure so that the thermal conduction of the partition plate 17 can be promoted.

As described above, in the refrigeration cycle apparatus 1 of Embodiment 2, the partition plate 17 has at least one of the recess 17a and the projection. With the unevenness such as the recess 17a or the projection of the partition plate 17, the surface area of the partition plate 17 becomes larger than in a case where the partition plate 17 has a flat shape. Therefore, the heat exchange amount increases by an increase in the heat transfer area between the high-pressure refrigerant and the low-pressure refrigerant, and the high-pressure refrigerant is easily subcooled. Further, the liquid surface of the high-pressure refrigerant easily spreads along the uneven surface of the partition plate 17. Thus, even if the high-pressure refrigerant separates into two phases that are the gas phase and the liquid phase, the liquid refrigerant is present on the partition plate 17. Accordingly, the decrease in the heat exchange amount as in the related art can be suppressed.

Embodiment 3

Figure 9:
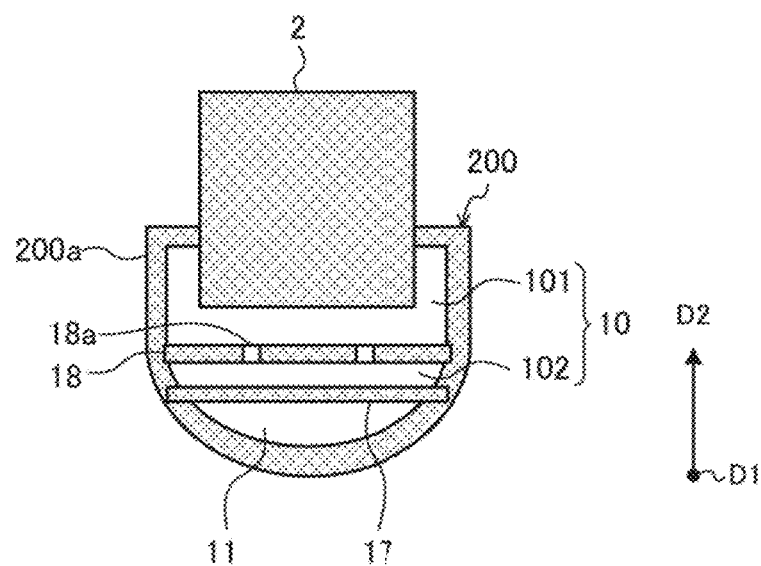
FIG. 9 is a sectional view illustrating the structure of a first header of a heat exchanger of a refrigeration cycle apparatus according to Embodiment 3.

FIG. 9 is a sectional view illustrating the structure of a first header of a heat exchanger of a refrigeration cycle apparatus according to Embodiment 3. Embodiment 3 differs from Embodiment 1 in that an auxiliary partition plate 18 is provided, and the other structures are similar to those in Embodiment 1. In Embodiment 3, the same parts as those in Embodiment 1 are represented by the same reference signs, and differences from Embodiment 1 are mainly described.

In Embodiment 3, the partition plate 17 has a substantially rectangular shape in plan view with its longitudinal direction being the first direction D1 and also has a flat plate, and both end surfaces extending in the longitudinal direction are connected to the inner surface of the outer wall 200a of the first header 200 similarly to Embodiment 1.

As illustrated in FIG. 9, the first header 200 in Embodiment 3 further includes the auxiliary partition plate 18 provided above the partition plate 17. Similarly to the partition plate 17, the auxiliary partition plate 18 has a substantially rectangular shape with its longitudinal direction being the first direction D1 and also has a flat plate, and both end surfaces extending in the longitudinal direction are connected to the inner surface of the outer wall 200a of the first header 200.

The auxiliary partition plate 18 is provided from the first end to the second end of the first header 200 in the longitudinal direction, and partitions the high-pressure refrigerant passage 10 into a first high-pressure refrigerant passage 101 where the lower ends of the plurality of heat transfer tubes 2 are disposed and a second high-pressure refrigerant passage 102 near the low-pressure refrigerant passage 11. That is, the first header 200 has the first high-pressure refrigerant passage 101, the second high-pressure refrigerant passage 102, and the low-pressure refrigerant passage 11 in this order to the bottom from the upper first high-pressure refrigerant passage 101 where the plurality of heat transfer tubes 2 is disposed.

The auxiliary partition plate 18 has a plurality of holes 18a through which the first high-pressure refrigerant passage 101 communicates with the second high-pressure refrigerant passage 102. The plurality of holes 18a is provided along the longitudinal direction of the auxiliary partition plate 18, that is, the longitudinal direction of the first header 200. In the example illustrated in FIG. 9, the auxiliary partition plate 18 also has a plurality of (for example, two) holes 18a in the transverse direction of the auxiliary partition plate 18.

The high-pressure refrigerant inlet 12 (see FIG. 2) for the high-pressure refrigerant is provided to the first header 200 while being connected to the lower second high-pressure refrigerant passage 102 of the high-pressure refrigerant passage 10. The high-pressure refrigerant flowing into the heat exchanger 100 through the high-pressure refrigerant inlet 12 first flows into the second high-pressure refrigerant passage 102 in the first header 200. The high-pressure refrigerant flowing into the second high-pressure refrigerant passage 102 flows into the first high-pressure refrigerant passage 101 through the holes 18a in the auxiliary partition plate 18, and flows into the second header 300 (see FIG. 2) through the heat transfer tubes 2.

In the structure in which the first header 200 includes the high-pressure partition 16 (see FIGS. 2, 5, and 6), the auxiliary partition plate 18 need not be provided in the entire region of the first header 200 in the longitudinal direction, but may be provided in part. The auxiliary partition plate 18 may be provided in the second header 300 or in each of the first header 200 and the second header 300.

Figure 10:
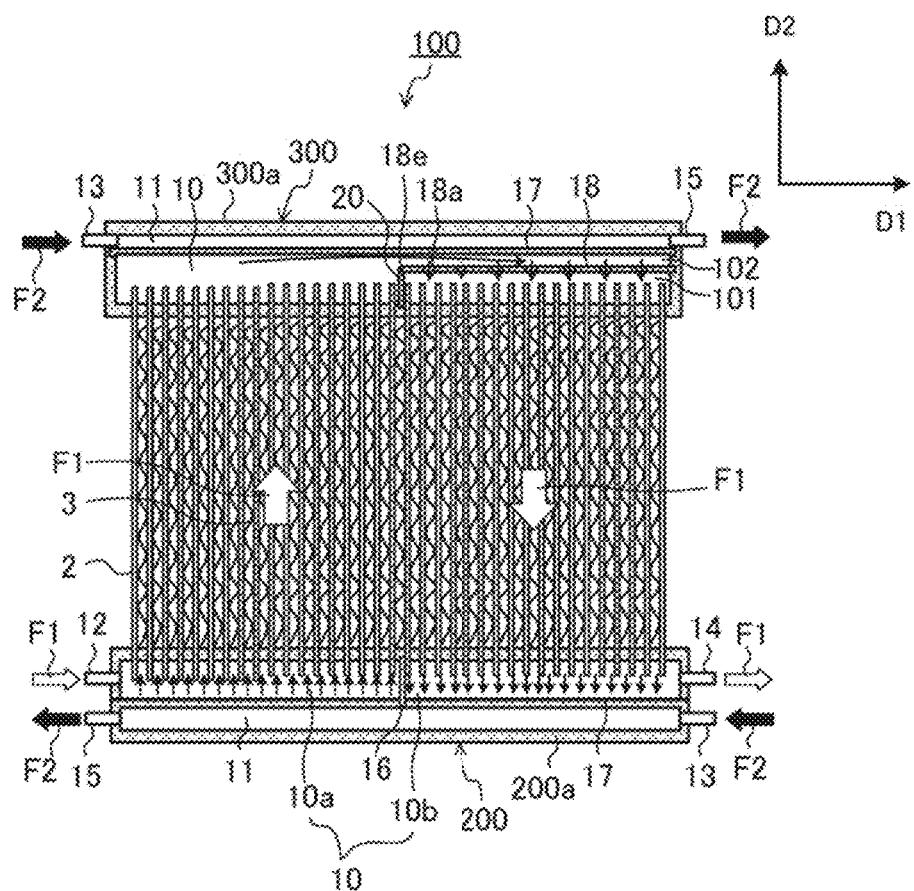
FIG. 10 is a schematic diagram illustrating Modification 4 of the heat exchanger in FIG. 9.

FIG. 10 is a schematic diagram illustrating Modification 4 of the heat exchanger 100 in FIG. 9. As illustrated in FIG. 10, the heat exchanger 100 in Modification 4 includes the high-pressure partition 16 in Embodiment 1 (see FIG. 2), the partition plates 17 provided in both the second header 300 and the first header 200 in Modification 3 (see FIG. 7), and the auxiliary partition plate 18 in Embodiment 3.

In Modification 4, one high-pressure partition 16 is provided at the center of the first header 200 in the longitudinal direction, and partitions the high-pressure refrigerant passage 10 of the first header 200 into the left high-pressure refrigerant passage 10a and the right high-pressure refrigerant passage 10b. That is, the structure of the first header 200 in Modification 4 is the same as that in the example illustrated in FIG. 2. The high-pressure refrigerant inlet 12 and the low-pressure refrigerant outlet 15 are provided at the first end of the first header 200 in the longitudinal direction, that is, at the left, and the high-pressure refrigerant outlet 14 and the low-pressure refrigerant inlet 13 are provided at the second end of the first header 200 in the longitudinal direction, that is, at the right.

In Modification 4, the low-pressure refrigerant inlet 13 and the low-pressure refrigerant outlet 15 are also provided to the second header 300. In the second header 300, the low-pressure refrigerant inlet 13 is provided at the first end of the second header 300 in the longitudinal direction, that is, at the left, and the low-pressure refrigerant outlet 15 is provided at the second end of the second header 300 in the longitudinal direction, that is, at the right.

In Modification 4, the auxiliary partition plate 18 is provided in a part of the second header 300 in the longitudinal direction. The heat exchanger 100 in Modification 4 includes a support plate 20 extending in the second direction D2 substantially parallel to the heat transfer tubes 2 from the outer wall 300a of the second header 300 in a part where the heat transfer tubes 2 are inserted. An end 18e of the auxiliary partition plate 18 is supported by the upper end of the support plate 20. The upper end of the support plate 20 is connected to the end 18e of the auxiliary partition plate 18. The upper end of the support plate 20 is positioned between the upper end surfaces of the heat transfer tubes 2 and the partition plate 17 in the second direction D2 so that the high-pressure refrigerant can flow between the auxiliary partition plate 18 and the partition plate 17 and between the auxiliary partition plate 18 and the upper ends of the plurality of heat transfer tubes 2.

In the example illustrated in FIG. 10, the auxiliary partition plate 18 is provided from the center to the second end of the second header 300 in the longitudinal direction, that is, in a right half, and the support plate 20 is provided at the center of the second header 300 in the longitudinal direction. The right end of the auxiliary partition plate 18 is supported while being connected to the second end, that is, the right side of the second header 300, and the left end 18e of the auxiliary partition plate 18 is supported by the support plate 20. The range of the auxiliary partition plate 18 may be set as appropriate depending on the disposition of the high-pressure partition 16, the high-pressure refrigerant inlet 12, and the high-pressure refrigerant outlet 14.

As shown by the outline arrows F1, the high-pressure refrigerant flowing into the left high-pressure refrigerant passage 10a of the first header 200 through the high-pressure refrigerant inlet 12 flows into the second header 300 through the plurality of left heat transfer tubes 2. The high-pressure refrigerant flowing into the second header 300 flows rightward, flows into the first high-pressure refrigerant passage 101 from the second high-pressure refrigerant passage 102 above the auxiliary partition plate 18 through the plurality of holes 18a, and flows into the right high-pressure refrigerant passage 10b in the first header 200 through the plurality of right heat transfer tubes 2. The high-pressure refrigerant flowing into the right high-pressure refrigerant passage 10b in the first header 200 flows out through the high-pressure refrigerant outlet 14 provided to the first header 200.

As shown by the solid arrows F2, the low-pressure refrigerant flows from left to right in the low-pressure refrigerant passage 11 of the second header 300 and from right to left in the low-pressure refrigerant passage 11 of the first header 200. In the heat exchanger 100 in Modification 4, the high-pressure refrigerant flowing in and out through the high-pressure refrigerant inlet 12 and the high-pressure refrigerant outlet 14 provided to the first header 200 can exchange heat with the low-pressure refrigerant in each of the first header 200 and the second header 300.

As described above, the refrigeration cycle apparatus 1 of Embodiment 3 includes the auxiliary partition plate 18 provided in the partial or entire region of the first header in the longitudinal direction. The auxiliary partition plate 18 partitions the high-pressure refrigerant passage 10 into the first high-pressure refrigerant passage 101 where the first ends of the plurality of heat transfer tubes 2 are disposed and the second high-pressure refrigerant passage 102 near the low-pressure refrigerant passage 11. The auxiliary partition plate 18 has the plurality of holes 18a through which the first high-pressure refrigerant passage 101 communicates with the second high-pressure refrigerant passage 102.

Since the auxiliary partition plate 18 narrows the region into which the high-pressure refrigerant flows, the refrigerant in the liquid phase having a large heat transfer coefficient can be present near the low-pressure refrigerant passage 11 even if the refrigerant separates into the liquid phase and the gas phase. Thus, the heat exchange with the low-pressure refrigerant via the partition plate 17 can be promoted.

Embodiment 4

Figure 11:
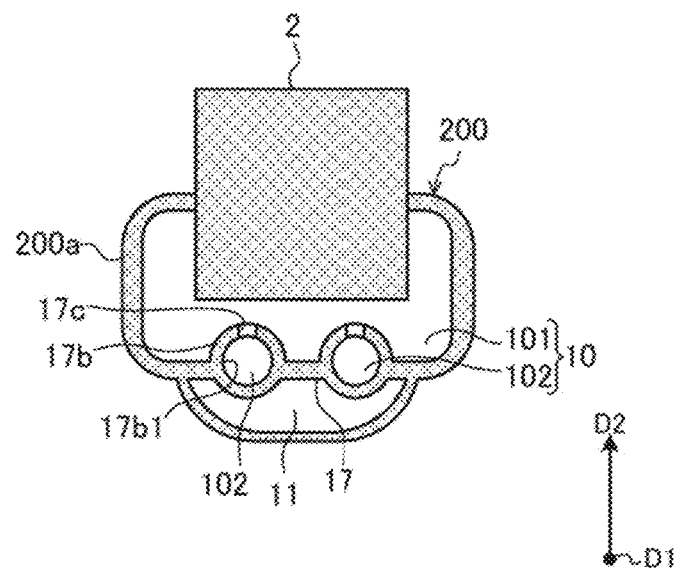
FIG. 11 is a sectional view illustrating the structure of a first header of a heat exchanger of a refrigeration cycle apparatus according to Embodiment 4.

FIG. 11 is a sectional view illustrating the structure of a first header of a heat exchanger of a refrigeration cycle apparatus according to Embodiment 4. Embodiment 4 differs from Embodiment 1 in that the partition plate 17 has a tubular portion, and the other structures are similar to those in Embodiment 1. In Embodiment 4, the same parts as those in Embodiment 1 are represented by the same reference signs, and differences from Embodiment 1 are mainly described.

In Embodiment 4, the partition plate 17 has a substantially rectangular shape in plan view with its longitudinal direction being the first direction D1 and both end surfaces extending in the longitudinal direction are connected to the inner surface of the outer wall 200a of the first header 200 similarly to Embodiment 1.

As illustrated in FIG. 11, the partition plate 17 in Embodiment 4 has at least one tubular portion 17b extending in the longitudinal direction of the first header 200, that is, the first direction D1. The tubular portion 17b can be provided, for example, from the first end to the second end of the partition plate 17 in the longitudinal direction. The partition plate 17 has a plurality of holes 17c through which the space where the lower ends of the plurality of heat transfer tubes 2 are disposed communicates with an internal space of the tubular portion 17b.

In the high-pressure refrigerant passage 10, a space on the outside of the partition plate 17 where the lower ends of the plurality of heat transfer tubes 2 are disposed may be referred to as "first high-pressure refrigerant passage 101", and the internal space of the tubular portion 17b of the partition plate 17 may be referred to as "second high-pressure refrigerant passage 102". That is, the second high-pressure refrigerant passage 102 between the partition plate 17 and the auxiliary partition plate 18 in Embodiment 3 is provided inside the partition plate 17 in Embodiment 4, and the auxiliary partition plate 18 need not be provided.

The plurality of holes 17c is provided along the longitudinal direction of the partition plate 17, that is, the longitudinal direction of the first header 200. In the example illustrated in FIG. 11, a plurality of (for example, two) tubular portions 17b is provided in the transverse direction of the partition plate 17, and each tubular portion 17b has the plurality of holes 17c along the longitudinal direction. With the two tubular portions 17b, the second high-pressure refrigerant passage 102 can be separated into two passages, and the high-pressure refrigerant and the low-pressure refrigerant can exchange heat more uniformly.

The tubular portion 17b has an inner peripheral surface 17b1 that is curved in cross section. In the example illustrated in FIG. 11, the tubular portion 17b has a cylindrical shape and the second high-pressure refrigerant passage 102 has a circular cross section. Since the second high-pressure refrigerant passage 102 has the circular cross section, the refrigerant can easily make transition to an annular flow that is more efficient in the heat exchange. Thus, the high-pressure liquid refrigerant and the low-pressure refrigerant can efficiently exchange heat with the effective use of the area of a boundary portion of the partition plate 17 between the second high-pressure refrigerant passage 102 and the low-pressure refrigerant passage 11.

In the case where the partition plate 17 has the tubular portion 17b, the tubular portion 17b has the plurality of holes 17c in its upper wall projecting toward the first high-pressure refrigerant passage 101. This upper wall functions as a shower pipe. Thus, the high-pressure refrigerant can easily flow into the openings at the lower ends of the plurality of heat transfer tubes 2 inserted into the outer wall 200a of the first header 200 from the facing tubular portion 17b.

Since the high-pressure refrigerant flows into the heat transfer tubes 2 in the first high-pressure refrigerant passage 101 after passing through the second high-pressure refrigerant passage 102, a distribution improvement effect can be obtained as well. In the structure in which the high-pressure partition 16 is provided in the first header 200 and separates the high-pressure refrigerant passage 10 in the longitudinal direction as illustrated in FIG. 2, heat can be exchanged with good distribution in the region where the ratio of the liquid phase is high, that is, the right high-pressure refrigerant passage 10b near the high-pressure refrigerant outlet 14. Thus, the overall performance of the condenser can be improved. In the structure in which the first header 200 includes the high-pressure partition 16 (see FIGS. 2, 5, and 6), the tubular portion 17b need not be provided in the entire region of the first header 200 in the longitudinal direction, but may be provided in part.

The structure of the partition plate 17 related to the shape of the tubular portion 17b, the number of the tubular portions 17b, and the positions and the number of the holes 17c is not limited to the structure described above. For example, two arcuate plate-shaped parts may be assembled into the partition plate 17 having one second high-pressure refrigerant passage 102. The partition plate 17 may have the holes 17c at any positions as long as the first high-pressure refrigerant passage 101 communicates with the second high-pressure refrigerant passage 102. All the refrigerant passages in the internal space of the first header 200 may have curved, non-angular shapes. In this case, the withstand pressure strength of the first header 200 is improved. Therefore, the thickness t2 (see FIG. 4) of the outer wall 200a of the first header 200 can be reduced and the costs can be reduced.

The high-pressure partition 16 may be omitted or a plurality of high-pressure partitions 16 may be provided in the first header 200. In the case where the high-pressure partition 16 is omitted, the high-pressure refrigerant passage 10 and the low-pressure refrigerant passage 11 of the first header 200 can be provided continuously from the first end to the second end in the longitudinal direction. Therefore, the first header 200 can be manufactured by extrusion or other methods and the manufacture is facilitated. The second header 300 may include the high-pressure partition 16 at a position different in the first direction D1 from the position of the high-pressure partition 16 in the first header 200 so that the high-pressure refrigerant in the heat exchanger 100 flows through a passage folded multiple times.

As described above, in the refrigeration cycle apparatus 1 of Embodiment 4, the partition plate 17 has at least one tubular portion 17b extending in the longitudinal direction of the first header 200. The partition plate 17 has the plurality of holes 17c through which the space where the first ends of the plurality of heat transfer tubes 2 are disposed (first high-pressure refrigerant passage 101) communicates with the internal space of the tubular portion 17b (second high-pressure refrigerant passage 102).

In Embodiment 4 as well, the tubular portion 17b can narrow the region into which the high-pressure refrigerant flows. Thus, in Embodiment 4, the refrigerant in the liquid phase having a large heat transfer coefficient can be present near the low-pressure refrigerant passage 11 similarly to Embodiment 3 even if the refrigerant separates into the liquid phase and the gas phase. Thus, the heat exchange with the low-pressure refrigerant via the partition plate 17 can be promoted.

The tubular portion 17b has the cylindrical shape. Therefore, the high-pressure refrigerant in the internal space of the tubular portion 17b (second high-pressure refrigerant passage 102) can easily make transition to an annular flow that is more efficient in the heat exchange. Thus, the high-pressure liquid refrigerant and the low-pressure refrigerant can efficiently exchange heat even if the high-pressure refrigerant separates into two phases. Further, the tubular portion 17b functions as a shower pipe, and the high-pressure refrigerant can easily flow into the openings at the lower ends of the plurality of heat transfer tubes 2 from the tubular portion 17b.

Embodiments 1 to 4 may be combined, modified, or omitted as appropriate. For example, the heat exchanger of Embodiment 2, 3, or 4 may be used instead of the heat exchanger 100 of the refrigeration cycle apparatus 1 of Embodiment 1.

REFERENCE SIGNS LIST

1: refrigeration cycle apparatus, 1A: outdoor unit, 1B: indoor unit, 2: heat transfer tube, 3: fin, 5: first pressure reducer, 6: compressor, 7: flow switching device, 8: second pressure reducer, 9: check valve, 10: high-pressure refrigerant passage, 10a: left high-pressure refrigerant passage, 10b: right high-pressure refrigerant passage, 10c: central high-pressure refrigerant passage, 11: low-pressure refrigerant passage, 12: high-pressure refrigerant inlet, 13: low-pressure refrigerant inlet, 14: high-pressure refrigerant outlet, 15: low-pressure refrigerant outlet, 16: high-pressure partition, 17: partition plate, 17a: recess, 17b: tubular portion, 17b1: inner peripheral surface, 17c: hole, 18: auxiliary partition plate, 18a: hole, 19: connection pipe, 20: support plate, 100: heat exchanger, 100a: first heat exchanger, 100b: second heat exchanger, 101: first high-pressure refrigerant passage, 102: second high-pressure refrigerant passage, 200: first header, 200a: outer wall, 300: second header, 300a: outer wall, C: refrigerant circuit, C1: main circuit, C2: bypass, D1: first direction, D2: second direction, F1: outline arrow, F2: solid arrow, P1: pipe, P2: pipe, Pb: bypass pipe, $S_H$: passage sectional area, $S_L$: passage sectional area, T1: branch point, T2: joining point, t1: thickness, t2: thickness

The invention claimed is:

1. A refrigeration cycle apparatus comprising:
   a refrigerant circuit in which at least a compressor, a condenser, a first pressure reducer, and an evaporator are connected by pipes,
   wherein the condenser includes
      a plurality of heat transfer tubes cooling refrigerant by air, each of the plurality of heat transfer tubes extending in an up-and-down direction and through which the refrigerant flows, and the plurality of heat transfer tubes being arranged in a lateral direction perpendicular to the up-and-down direction, with a gap for the air to flow between adjacent heat transfer tubes;
      a first header having a tubular outer wall which extends in the lateral direction and into which first ends of the plurality of heat transfer tubes are inserted;
      a partition plate that is provided from a first end to a second end of the first header in a longitudinal direction, partitions an internal space of the first header into a high-pressure refrigerant passage where the first ends of the plurality of heat transfer tubes are disposed and a low-pressure refrigerant passage where the first ends of the plurality of heat transfer tubes are not disposed, and is configured to exchange heat between high-pressure refrigerant flowing through the high-pressure refrigerant passage and low-pressure refrigerant flowing through the low-pressure refrigerant passage in the first header; and
      an auxiliary partition plate that is provided in a partial or entire region of the first header in the longitudinal direction and partitions the high-pressure refrigerant passage into a first high-pressure refrigerant passage where the first ends of the plurality of heat transfer tubes are disposed and a second high-pressure refrigerant passage near the low-pressure refrigerant passage, and
      wherein the auxiliary partition plate has a plurality of holes through which the first high-pressure refrigerant passage communicates with the second high-pressure refrigerant passage.

2. The refrigeration cycle apparatus of claim 1, wherein a passage sectional area of the high-pressure refrigerant passage is larger than a passage sectional area of the low-pressure refrigerant passage in the longitudinal direction of the first header.

3. The refrigeration cycle apparatus of claim 1,
   wherein an inlet of the high-pressure refrigerant passage is provided at the first end of the first header in the longitudinal direction, and
   wherein an inlet of the low-pressure refrigerant passage is provided at the second end of the first header in the longitudinal direction.

4. The refrigeration cycle apparatus of claim 1, wherein an inlet of the high-pressure refrigerant passage and an inlet of the low-pressure refrigerant passage are provided at one same end of the first header in the longitudinal direction.

5. The refrigeration cycle apparatus of claim 1, wherein a thickness of the partition plate is smaller than a thickness of the outer wall of the first header.

6. The refrigeration cycle apparatus of claim 1, wherein an upper surface and a lower surface of the partition plate comprise at least one of a recess and a projection.

7. The refrigeration cycle apparatus of claim 1, wherein, in the condenser, an outlet of the high-pressure refrigerant in the condenser is provided to the first header including the partition plate.

8. The refrigeration cycle apparatus of claim 1, wherein two-phase gas-liquid or single-phase gas refrigerant flows into the high-pressure refrigerant passage of the condenser, and the condenser is configured to condense the refrigerant flowing into the high-pressure refrigerant passage so that the refrigerant turns into liquid refrigerant.

9. The refrigeration cycle apparatus of claim 1, wherein the partition plate is made of a metal material.

10. The refrigeration cycle apparatus of claim 1, further comprising:
   a main circuit in which at least the compressor, the condenser, the first pressure reducer, and the evaporator are connected by pipes; and
   a bypass comprising a bypass pipe connecting a pipe between the condenser and the first pressure reducer in the main circuit and a pipe between the evaporator and the compressor in the main circuit, and a second pressure reducer that is provided in the bypass pipe and is configured to reduce a pressure of refrigerant,
   wherein the high-pressure refrigerant passage of the condenser is connected to the pipes of the main circuit and constitutes the main circuit, and
   wherein the low-pressure refrigerant passage of the condenser is connected between the second pressure reducer in the bypass pipe and the compressor and constitutes the bypass.

11. The refrigeration cycle apparatus of claim 1, wherein the auxiliary partition plate is flat.

12. The refrigeration cycle apparatus of claim 1, wherein the auxiliary partition plate has a rectangular shape.

13. The refrigeration cycle apparatus of claim 1, wherein both end surfaces of the auxiliary partition plate extending in the longitudinal direction are connected to inner surfaces of the tubular outer wall.

14. A refrigeration cycle apparatus comprising:
   a refrigerant circuit in which at least a compressor, a condenser, a first pressure reducer, and an evaporator are connected by pipes,
   wherein the condenser includes
      a plurality of heat transfer tubes cooling refrigerant by air, each of the plurality of heat transfer tubes extending in an up-and-down direction and through which the refrigerant flows, and the plurality of heat transfer tubes being arranged in a lateral direction perpendicular to the up-and-down direction, with a gap for the air to flow between adjacent heat transfer tubes;
      a first header having a tubular outer wall which extends in the lateral direction and into which first ends of the plurality of heat transfer tubes are inserted; and
      a partition plate that is provided from a first end to a second end of the first header in a longitudinal direction, partitions an internal space of the first header into a high-pressure refrigerant passage where the first ends of the plurality of heat transfer tubes are disposed and a low-pressure refrigerant passage where the first ends of the plurality of heat transfer tubes are not disposed, and is configured to exchange heat between high-pressure refrigerant flowing through the high-pressure refrigerant passage and low- pressure refrigerant flowing through the low-pressure refrigerant passage in the first header,
   wherein the partition plate comprises at least one tubular portion extending in the longitudinal direction of the first header, and
   wherein the partition plate has a plurality of holes through which a space where the first ends of the plurality of heat transfer tubes are disposed communicates with an internal space of the tubular portion.

15. The refrigeration cycle apparatus of claim 14, wherein the tubular portion has a cylindrical shape.

16. A refrigeration cycle apparatus comprising:
   a refrigerant circuit in which at least a compressor, a condenser, a first pressure reducer, and an evaporator are connected by pipes,
   wherein the condenser includes
      a plurality of heat transfer tubes cooling refrigerant by air, each of the plurality of heat transfer tubes extending in an up-and-down direction and through which the refrigerant flows, and the plurality of heat transfer tubes being arranged in a lateral direction perpendicular to the up-and-down direction, with a gap for the air to flow between adjacent heat transfer tubes:
      a first header having a tubular outer wall which extends in the lateral direction and into which first ends of the plurality of heat transfer tubes are inserted;
      a partition plate that is provided from a first end to a second end of the first header in a longitudinal direction, partitions an internal space of the first header into a high-pressure refrigerant passage where the first ends of the plurality of heat transfer tubes are disposed and a low-pressure refrigerant passage where the first ends of the plurality of heat transfer tubes are not disposed, and is configured to exchange heat between high-pressure refrigerant flowing through the high-pressure refrigerant passage and low-pressure refrigerant flowing through the low-pressure refrigerant passage in the first header:
      a tubular second header extending in the lateral direction and into which second ends of the plurality of heat transfer tubes are inserted; and
      a partition plate that is provided from a first end to a second end of the second header in a longitudinal direction, partitions an internal space of the second header into a high-pressure refrigerant passage where the second ends of the plurality of heat transfer tubes are disposed and a low-pressure refrigerant passage farther away from the plurality of heat transfer tubes than is the high-pressure refrigerant passage, and is configured to exchange heat between high-pressure refrigerant flowing through the high-pressure refrigerant passage and low-pressure refrigerant flowing through the low-pressure refrigerant passage in the second header.

17. The refrigeration cycle apparatus of claim 16, wherein the condenser comprises a connection pipe through which the low-pressure refrigerant passage of the first header communicates with the low-pressure refrigerant passage of the second header.

* * * * *